United States Patent [19]
Vaughn et al.

[11] Patent Number: 5,657,499
[45] Date of Patent: Aug. 19, 1997

[54] REDUCED ENERGY AND VOLUME AIR PUMP FOR A SEAT CUSHION

[75] Inventors: Mark R. Vaughn; Edward J. Constantineau, both of Albuquerque; Gordon E. Groves, Tijeras, all of N. Mex.

[73] Assignee: Sandia Corporation, Albuquerque, N. Mex.

[21] Appl. No.: 586,444

[22] Filed: Jan. 11, 1996

[51] Int. Cl.$^6$ .............................. A47C 27/10; A61G 7/057
[52] U.S. Cl. .................. 5/654; 5/713; 5/940; 297/284.6; 297/452.41; 297/DIG. 3
[58] Field of Search .................................. 5/654, 713, 710, 5/940; 297/284.1, 284.6, 452.41, DIG. 3

[56] References Cited

U.S. PATENT DOCUMENTS

| | | | |
|---|---|---|---|
| 4,707,027 | 11/1987 | Horvath et al. | 297/284.6 |
| 4,938,528 | 7/1990 | Scott | 297/DIG. 3 |
| 5,163,737 | 11/1992 | Navach et al. | 5/654 |
| 5,500,965 | 3/1996 | Hannagan et al. | 5/654 |

*Primary Examiner*—Alexander Grosz
*Attorney, Agent, or Firm*—Gregory A. Cone

[57] ABSTRACT

An efficient pump system for transferring air between sets of bladders in a cushion. The pump system utilizes a reversible piston within a cylinder in conjunction with an equalizing valve in the piston which opens when the piston reaches the end of travel in one direction. The weight of a seated user then forces air back across the piston from an inflated bladder to the previously deflated bladder until the pressure is equalized. In this fashion the work done by the pump is cut in half. The inflation and deflation of the different bladders is controlled to vary the pressure on the several pressure points of a seated user. A principal application is for wheel chair use to prevent pressure ulcers.

17 Claims, 6 Drawing Sheets

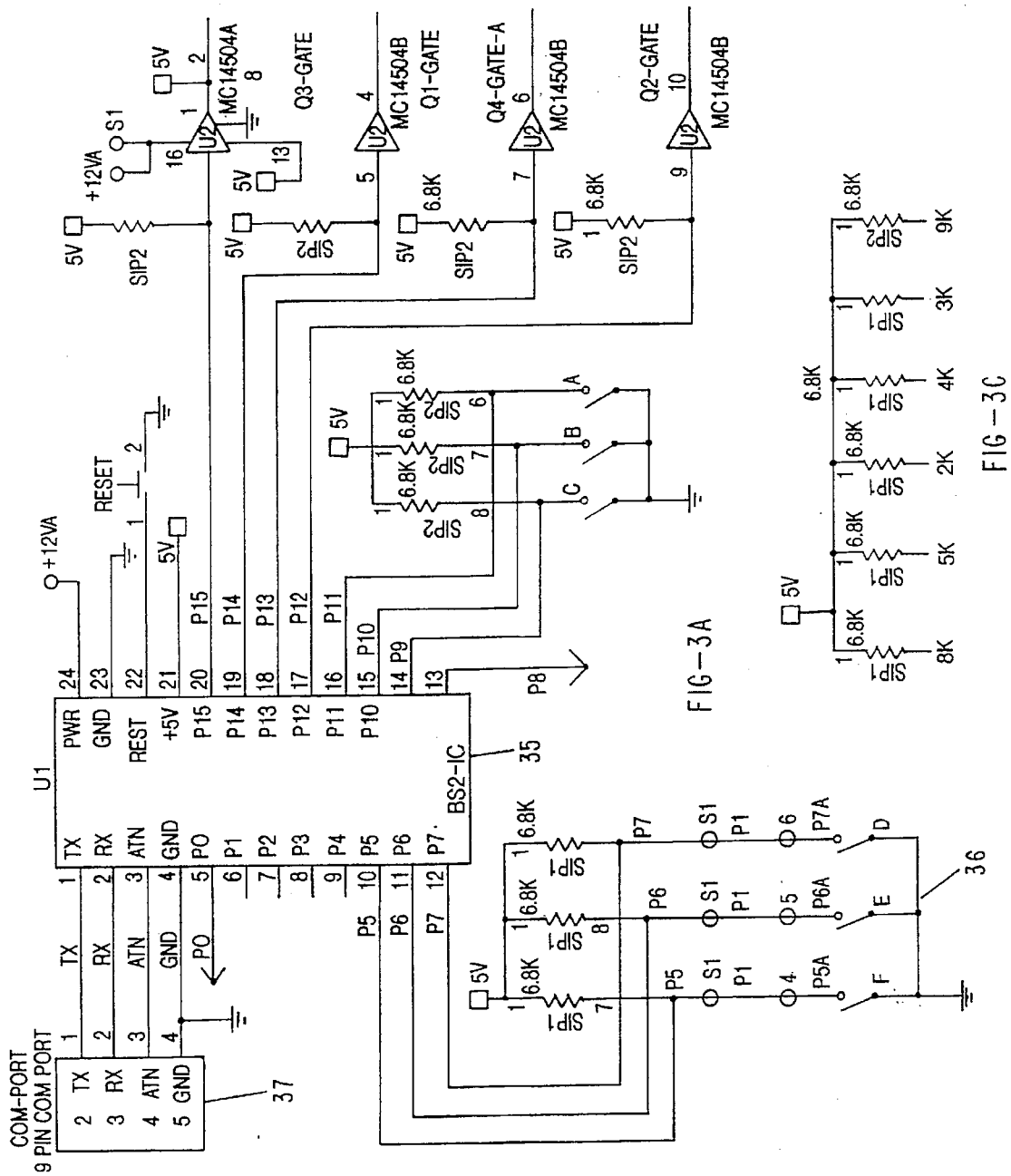

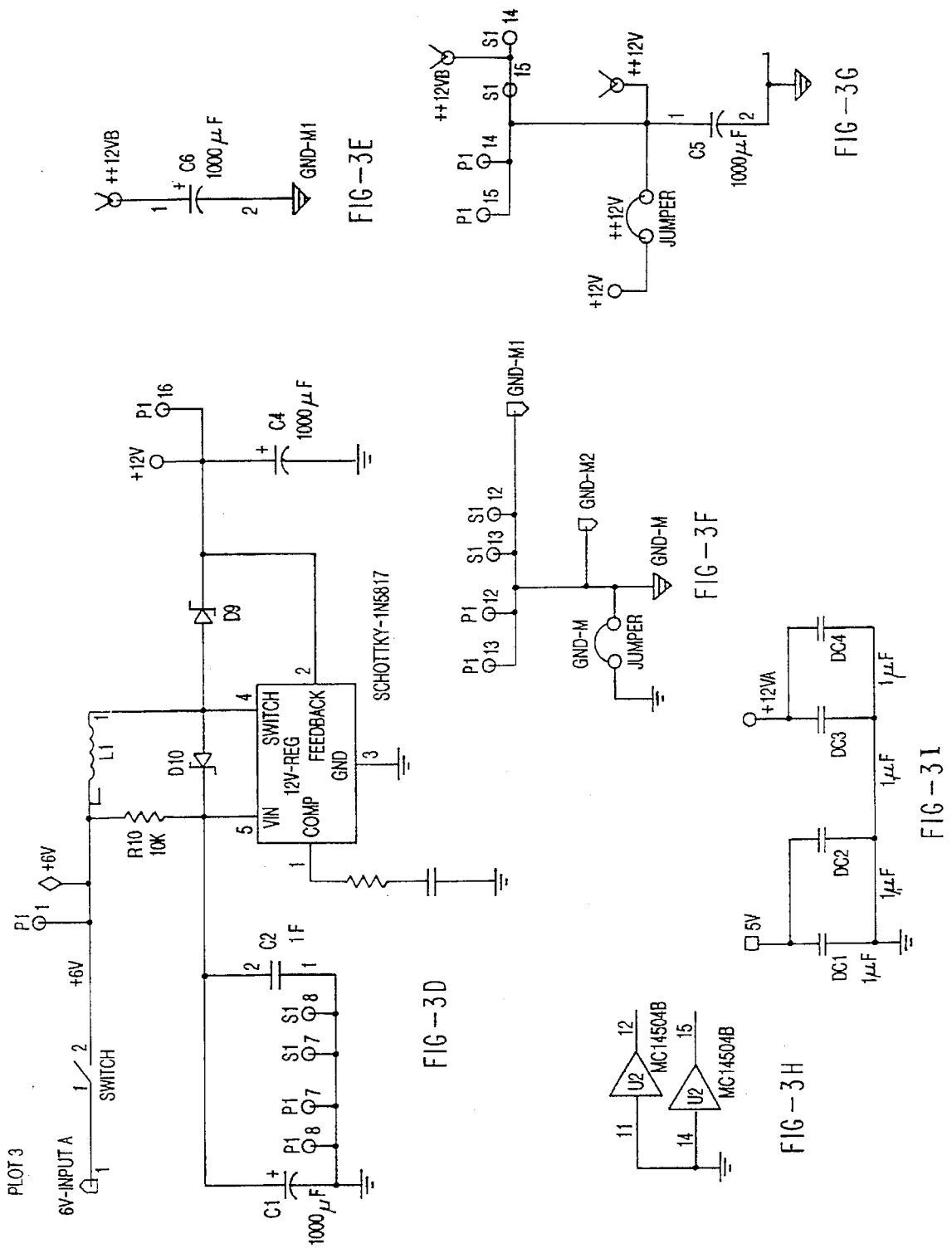

5,657,499

REDUCED ENERGY AND VOLUME AIR PUMP FOR A SEAT CUSHION

This invention was made with Government support under Contract DE-AC04-94AL85000 awarded by the U.S. Department of Energy. The government has certain rights in the invention.

BACKGROUND OF THE INVENTION

This invention relates to reversible pumps. More particularly, this invention relates to such a pump integrated with a system to efficiently transfer fluid between inflatable bladders in seat cushions by use of the pump and an equalization valve that equalizes pressure between bladders after one bladder has reached its desired maximum inflation and before the pump reverses to begin inflating another bladder.

Although the pump system of this invention has a variety of different applications, its main application is as a system to inflate and deflate sets of bladders in seat cushions. The ability to shift the pressure points on the anatomy of a seated person by inflating and deflating air bladders has important medical, safety and comfort effects. People who are confined to wheel chairs for long periods of time often develop pressure sores on their posteriors. One solution is that presented in U.S. Pat. No. 5,163,737 to Navach et al. in which teaches a contoured cushion with inflatable bladders. The bladders therein are inflated either by motion of the person to shift air between bladders or by an external air compressor with sequenced inflation valves and exhaust valves. This reference contains an excellent description of the medical aspects of pressure ulcers and the preferred locations for bladders and the conformation of the cushion as a whole. As such, this reference is incorporated by reference in its entirety. Nevertheless, the inflation/deflation systems taught therein are not optimal for some applications. The power drain of an air compressor is too much for many electric wheel chairs, and many users either do not have the physical strength to push on the bladders themselves. Also, other users lack feeling in these areas of their bodies and cannot sense when the blood circulation to their pressure points has ceased.

Another solution was later developed that utilized a constant flow turbine air pump with a sequencing valve. This battery-powered pressure supply system was packaged in a separate box and attached to the back of a wheelchair. While effective in clinical settings, it requires too much battery energy, is too heavy, and is too large to be conveniently used in home settings.

Use of cushions with inflatable bladders is not limited to wheel chair applications. Anyone sitting for prolonged periods of time, in a chair can benefit from a cushion with bladders that inflate and deflate to shift the pressure points and stimulate blood circulation. Long haul truck drivers in particular have a need for seats employing such cushions. Tests have shown that such cushions improve their alertness, implying an important safety benefit. Such inflatable seat cushions have existed for some time. However, the pump systems are not particularly efficient. One typical arrangement is that taught in U.S. Pat. No. 4,938,528 to Scott which mentions that reversible pumps can be used to inflate and deflate a bladder but also opines that such pumps are inefficient. This reference does not employ the equalization valve of the present invention. There remains an unmet need in the art for a high efficiency pump system that will transfer fluid between bladders for applications such as these seat cushions, particularly for mobile applications.

SUMMARY OF THE INVENTION

The pump system of this invention transfers fluid, typically air, between bladders in the following fashion. A reversible pump is disposed between two bladders. The pump comprises a cylinder with an internal piston with a first chamber on one side of the piston in fluid communication with one of the bladders and a second chamber on the other side of the piston in fluid communication with another bladder. When the piston reaches the end of its travel in one direction pushing most of the air out of the first chamber and inflating the one bladder to the desired extent, an equalizing valve means opens and allows the fluid pressure to equalize across the piston, back through the pump and into the other bladder. The piston then reverses direction, the valve closes, and inflation of the other bladder begins. In this fashion, the weight era person seated on the cushion is utilized in a passive fashion to push the air from the one bladder to the other when the equalization valve is open. This essentially cuts the work to be done by the pump in half. There are a variety of ways to construct such a system. One such way is described below.

DETAILED DESCRIPTION OF THE INVENTION

This invention arose from the need to create a new pump system for inflating bladders in special cushions for use in wheel chairs to prevent pressure ulcers. These bladders must be inflated and deflated in a specific sequence and for a specific duration to be most effective. A wheel chair platform is a particularly difficult one because of the energy storage limitations for on-board batteries and the energy demands of a pump system for the bladders and possibly electric propulsion of the chair by other electric motors as well.

The task of the pump system for this application is to alternately inflate and deflate two sets of bladders, one on either side of the pump. In the particular cushion utilized, there are four sets of bladders whose inflation/deflation cycles are preferably conducted with ninety degrees of phase separation, and this required two pumps. For each pump, while one bladder set is inflating, the other set is deflating. A piston type pump is well suited to this task because, as one side is pushing air out to one set of bladders, the other side of the pump is drawing air in from the other set. The problem with this simple solution is that it would take a pump with an internal volume capacity equal to the volume of the bladders. In addition, since the pump is pushing against the bladder pressure for the entire inflation, battery energy is wasted.

The solution to the problem was to employ an intrinsic equalization valve at the end of the stroke of the pump. This valve vents one side of the piston to the other. This allows air flow from the pressurized bladder set to the empty set, using the force due to the weight of the person sitting on the seat to squeeze the inflated bladder set. This allows the pump volume to be cut almost in half. Required motor power is also cut in half. Because of this advance, the pumps, batteries and circuitry can now be made to fit into the seat cushion itself, rather than have a separate box as was done in prior products.

Figure 1:
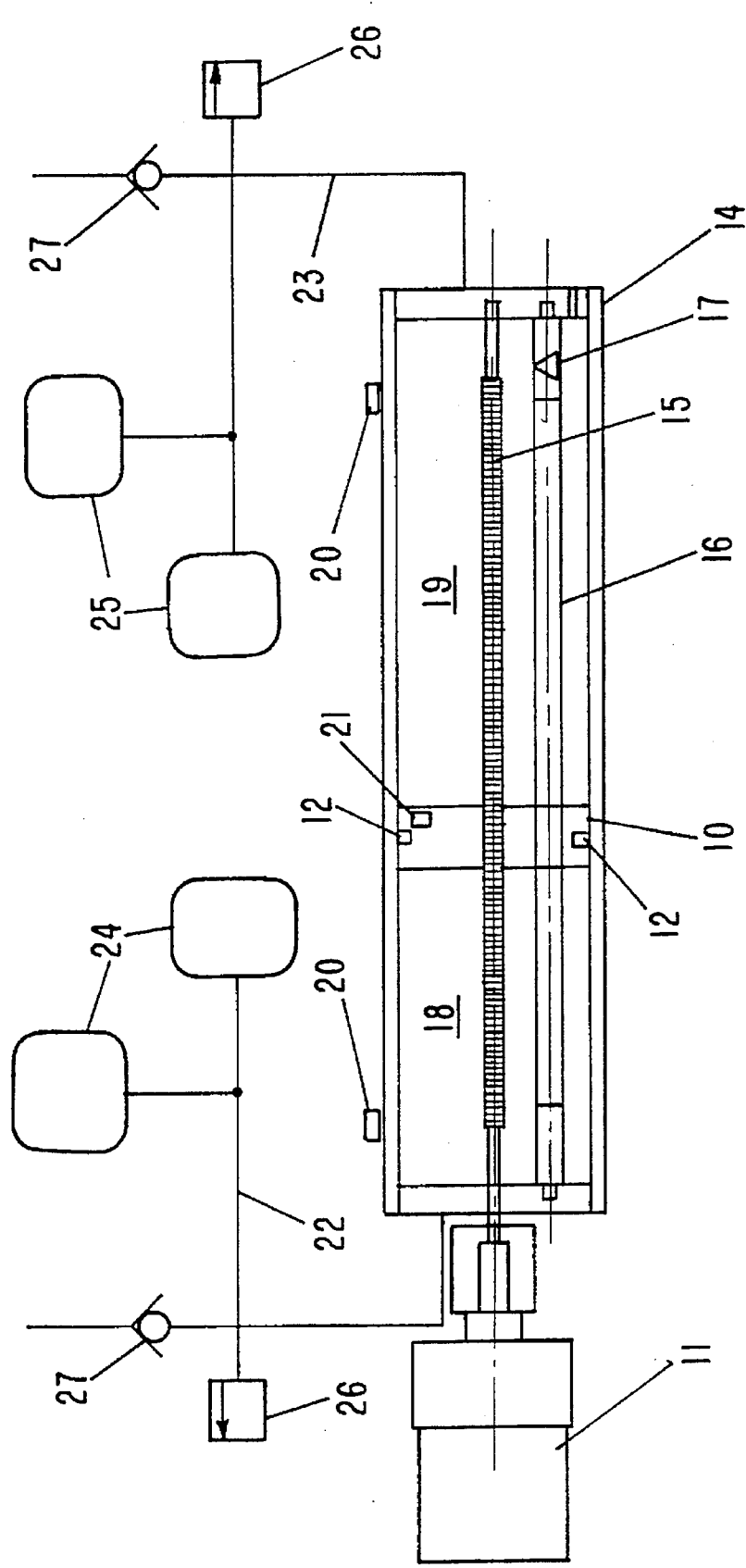
FIG. 1 is a diagram showing a cross sectional view of the pump and equalizing valve and a schematic view of the rest of the system with the bladders.

Turning now to FIG. 1, the pump is made up of several components. The piston 10 itself uses a commercial seal 12 which seals against the inside of the stainless steel cylinder 14, as well as a seal, not shown, that rides on a guide/valve rod 16. The seals are available from Minnesota Rubber Company as 'Kapseal' #6129. The guide rod prevents rotation of the piston. It also provides the intrinsic equalization valve due to a cut triangular relief 17 inlet into both ends of the guide rod. Only the right relief cut is shown in the figure. This relief cut breaks the seal about the guide rod and allows air to flow between the two pump chambers 18 and 19. An earlier attempt to create the equalization valve had been to narrow the diameter of the guide rod at the end of the piston travel. However, the seal about the guide rod would tend to fall out at this point, and this solution is not preferred. Other equalizing valve implementations are possible. The piston is driven back and forth by a simple lead screw 15 driven by a small electric gear motor 11. Reversal of the motor is controlled by magnetic reed switches 20 attached to the exterior of the cylinder. These switches respond to the field of a magnet 21 inside the piston through the cylinder wall. This prevents the sealing problem of two switches penetrating the pump cavities. In ease the motor does not reverse, the ends of the lead screw have had the threads removed so that the piston will simply screw itself off the end of the threads before binding up and stalling the motor. The reed switches and the gear motor are connected to a controller and a battery. The electronic components of the system are discussed in more detail below.

The operation of this system is as follows. Assume that the piston is traveling from left to right and inflating the right hand bladder set 25. The air in chamber 19 is transferred to the bladders 25 until the piston nears the end of its travel and reaches the triangular relief cut 17. At this point the seal between the guide rod and the piston is broken and air flows back from the bladders 25 and the one chamber 19 into the other chamber 18 and the other bladders 24 because of the weight of the person sitting on the cushion/bladders. The air then flows to the left until the pressure is equalized. Then the motor reverses when the controller senses the proximity of the magnet to the right reed switch and moves the piston back to the left to repeat the cycle for inflating the other set of bladders 24. This particular pump system inflates/deflates two bladders on each side of the pump. It could also inflate/deflate a single bladder or three or more bladders on each side of the pump if the application so requires. The most efficient solution to any such application would require would require that relatively equal total volumes would be inflated/deflated on either side of the pump.

The operation of the system is controlled by a set of sensors, a microcontroller, timing electronics, a microprocessor, and passive pneumatic valves. The pressure level in each bladder set is controlled by passive relief valves 26 which can be pre-selected to open at prescribed pressure levels. The pressure system is designed such that after two to three cycles have been completed, the pump tubes supply a greater volume of air than is required to each bladder set, especially when their volume is restricted by the weight of the user. Relief valves are selected such that the pressure in each bladder set reaches one to two psi gage pressure. After a piston has reached the end of a stroke and the pressurized air in one set of bladders has been vented via the internal equalization valve to the other side of the piston within the cylinder, a low pressure would normally result in the exhausted bladder sets as the piston travels toward the opposite end of the tube. Passive check valves 27 are used in each side of the pneumatic circuit to assure that the pressure in a deflated bladder set remains at atmospheric pressure. With this arrangement, as the piston travels toward the opposite stroke end, "make-up" air is drawn into that side of the pneumatic circuit. The check valve then automatically closes to prevent the escape of the pressurized air that enters the low pressure bladder set when the piston reaches the end of a stroke and the equalization valve in the cylinder vents pressurized air from the pressurized bladder set to the deflated set.

Figure 3B:
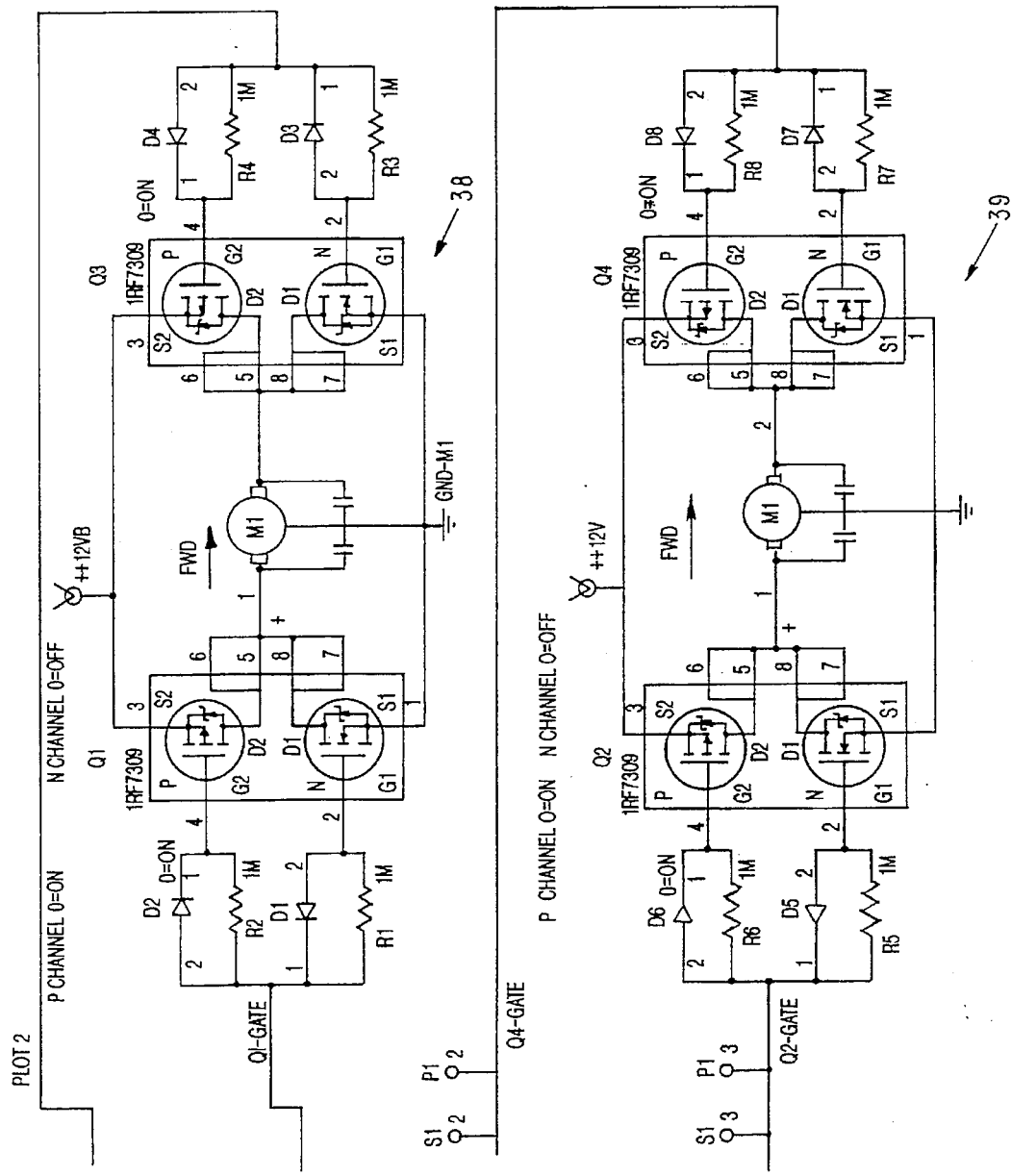
FIGS. 3A, B, C, D, E, F, G, H, J and K are electrical schematics of the circuits associated with the microcontroller for the pump system.
Figure 3J:
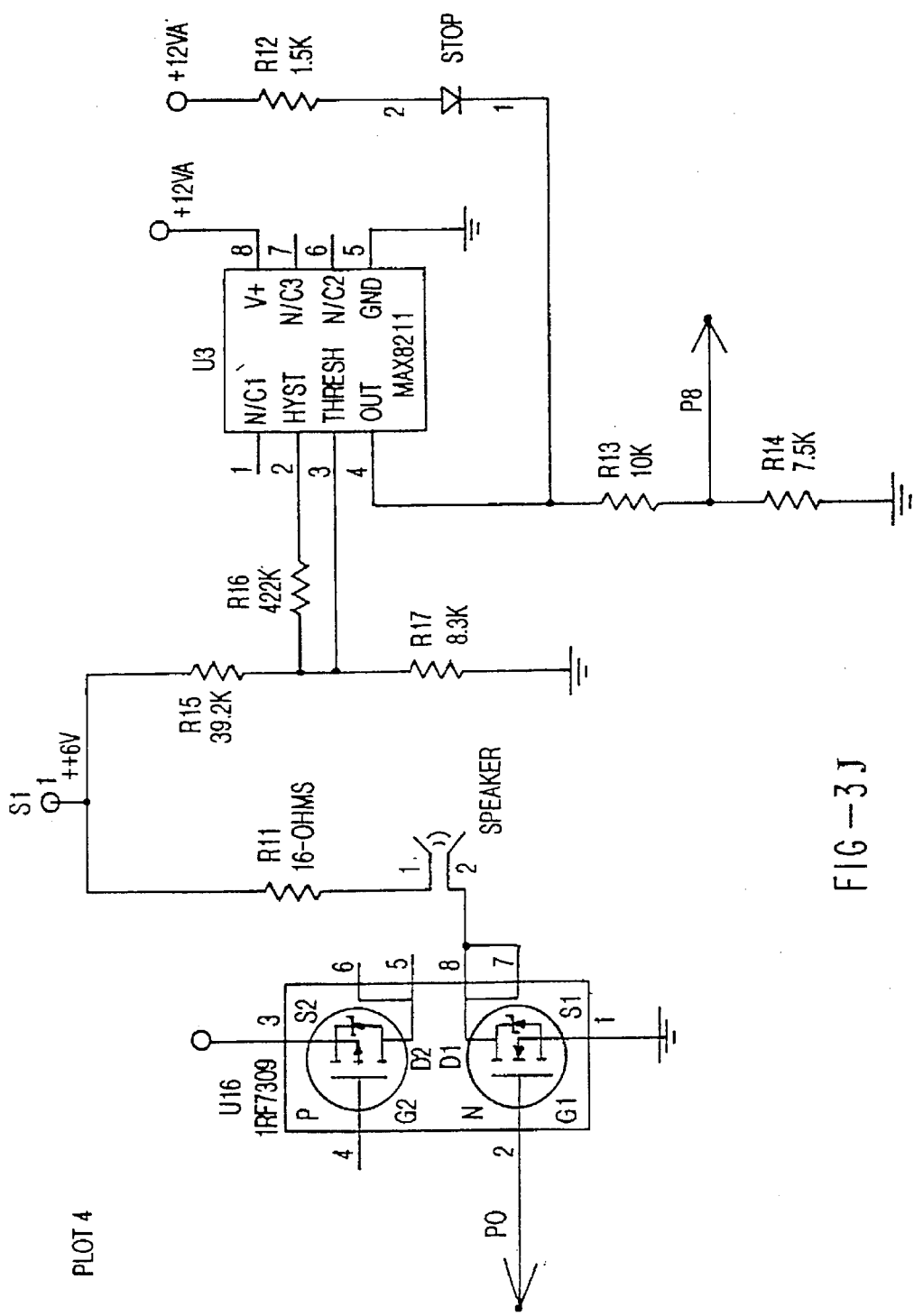

The power supply to the motor, the reversing of the motor, the sensing of the position of the piston in the cylinder, maintenance of the phase separation between pumps and bladder sets, and the shutdown safety features for the system are handled by a programmable microcontroller and a programmable microprocessor with associated signal processing and power conditioning electronics. The microcontroller subsystem is shown in more detail in FIGS. 3A, B, C, D, E, F, G, H, J and K. Of these figures, FIGS. 3A and 3B are the two halves of the main circuit and of the most interest. The circuit is controlled by the microcontroller 35 which is a Parallax BS-2. It communicates with the microprocessor, not shown, through the communications port 37 and also includes the reed switches 36 to sense the position of the piston in the cylinder and the motors and associated control electronics 38 and 39. The remaining circuits are mostly power supply and grounding circuits. The power to the microcontroller is supplied by a DC to DC converter/power regulator that is ultimately connected to a battery, not shown. The microcontroller also monitors battery voltage for alarm conditions and activates an indicator light and an audible alarm as shown in FIG. 3K. The microprocessor is not shown but is a straight forward implementation that supplies commands to the microcontroller for the timing of the pump cycles as well as operation of the safety circuits and indicators. FIG. 3K illustrates one the safety circuits, here providing audio and visual annunciation of a several possible alarm conditions, including low battery voltage or stalled pump.

Figure 2:
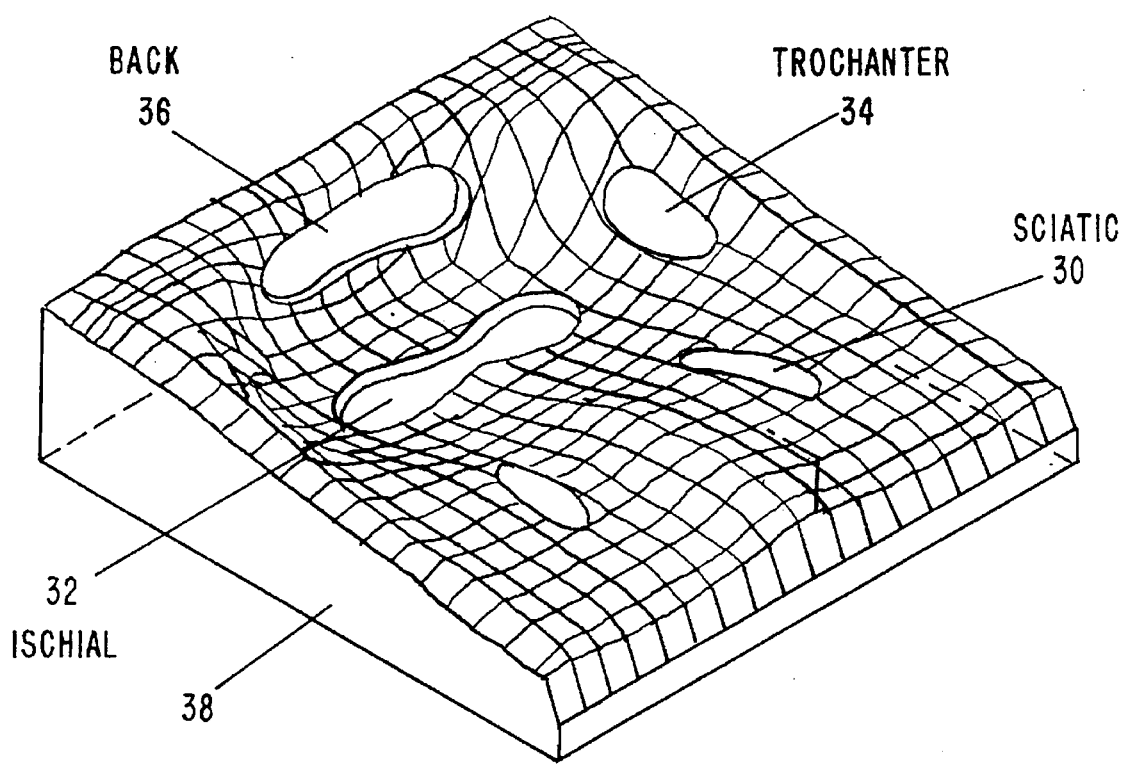
FIG. 2 is an isometric view of a seat cushion showing the location of the pairs of bladders.

This pump system was designed to integrate with the type of seat cushion illustrated in FIG. 2 which is adapted from U.S. Pat. No. 5,163,737 to Navach et al. This figure shows the pressure points 30, 32, 34 and 36 that can be supported by sets of bladders located symmetrically across the midline of the cushion. The pump, motor, battery and associated electronics can all be contained within the base of the cushion 38.

Many variations in the construction and application of this pump system are possible. Fluids other that air may be employed. Pumps other than the particular reversible pump here illustrated may be employed. The true scope of the invention is to be found in the appended claims.

I claim:

1. A pump system comprising:
   at least one pair of inflatable bladder means within a cushion to support a body having sufficient weight to compress the bladder means;
   a reversible pump connected to drive means, the pump comprising a piston within a cylinder, the piston being moved within the cylinder by the drive means and defining a first chamber section within the cylinder on one side of the piston and a second chamber within the cylinder on the other side of the piston;

first fluid conduit means connecting one bladder means of the pair of bladder means to the first chamber section;

second fluid conduit means connecting the other bladder means of the pair of bladder means to the second chamber section; and two valve means disposed respectively within the first and second chamber sections near the distal end of the travel of the piston within a chamber that open and equalize the pressure across the piston when the piston reaches the valve means.

2. The system of claim 1 wherein the reversible pump further comprises guide rod means located within the cylinder such that the piston is pierced by the guide rod means and the interface therebetween is closed by a seal in the piston surrounding the guide rod.

3. The system of claim 2 wherein the two valve means comprise relief sections cut into the guide rod means such that when the piston reaches one of the relief sections towards the end of its travel within the cylinder the seal no longer closes the interface between the piston and the guide rod means.

4. The system of claim 2 wherein the two valve means comprise portions of reduced cross sectional area of the guide rod means.

5. The system of claim 1 wherein the body is a human.

6. The system of claim 1 wherein a bladder means comprises at least two bladders.

7. The system of claim 1 wherein a bladder means comprises one bladder.

8. The system of claim 1 additionally comprising means to sense the end of travel of the piston at each end of the cylinder in communication with means to reverse the direction of travel of the piston within the cylinder.

9. The system of claim 8 wherein the means to sense the end of travel comprises at least one magnetic reed switch at each end of the cylinder and a permanent magnet mounted on the piston of sufficient strength to cycle one of the reed switches when the magnet is in close proximity thereto.

10. The system of claim 1 wherein the pump system is located within the volume of the cushion.

11. A pump system comprising:

at least one pair of inflatable bladder means within a cushion to support a body having sufficient weight to compress the bladder means;

a reversible pump connected to drive means, the pump comprising a piston within a cylinder, the piston being moved within the cylinder by the drive means and defining a first chamber section within the cylinder on one side of the piston and a second chamber within the cylinder on the other side of the piston and guide rod means located within the cylinder such that the piston is pierced by the guide rod means and the interface therebetween is closed by a seal in the piston surrounding the guide rod;

first fluid conduit means connecting one bladder means of the pair of bladder means to the first chamber section;

second fluid conduit means connecting the other bladder means of the pair of bladder means to the second chamber section; and two valve means disposed respectively within the first and second chamber sections near the distal end of the travel of the piston within a chamber that open and equalize the pressure across the piston when the piston reaches the valve means comprising portions of reduced cross sectional area of the guide rod means.

12. The system of claim 11 further comprising means to sense the end of travel of the piston at each end of the cylinder in communication with means to reverse the direction of travel of the piston within the cylinder.

13. The system of claim 12 wherein the means to sense the end of travel comprises at least one magnetic reed switch at each end of the cylinder and a permanent magnet mounted on the piston of sufficient strength to cycle one of the reed switches when the magnet is in close proximity thereto.

14. The system of claim 12 wherein the cushion is a wheel chair seat cushion.

15. The system of claim 12 wherein the pump system is contained within the volume of the cushion.

16. The system of claim 11 further including an electronic control system for controlling the direction of travel of the piston and the timing of the operation of the drive means.

17. The system of claim 16 wherein the electronic control system further includes alarm means to alert a user of a low battery voltage from a battery supplying power to the drive means.

* * * * *